United States Patent [19]  [11] 4,073,534
Hira  [45] Feb. 14, 1978

[54] MOTOR VEHICLE WITH A SHELF IN ITS LUGGAGE COMPARTMENT

[75] Inventor: Kazumi Hira, Fujisawa, Japan

[73] Assignee: Nissan Motor Company, Limited, Japan

[21] Appl. No.: 710,720

[22] Filed: Aug. 2, 1976

[30] Foreign Application Priority Data

Sept. 5, 1975 Japan .......................... 50-122408[U]

[51] Int. Cl.² .............................................. B60R 3/08
[52] U.S. Cl. .................................... 296/37.16; 296/76
[58] Field of Search ................... 296/37.1, 37.2, 37.5, 296/37.8, 37.16, 76

[56] References Cited

U.S. PATENT DOCUMENTS

| 3,181,911 | 5/1965 | Peras | 296/37.1 |
| 3,446,526 | 5/1969 | Peters | 296/37.16 |
| 3,909,060 | 9/1975 | Katayama | 296/76 |

FOREIGN PATENT DOCUMENTS

| 848,747 | 7/1949 | Germany | 296/37.16 |

Primary Examiner—Philip Goodman

[57] ABSTRACT

A motor vehicle has an open luggage compartment behind the rearmost seat. The luggage compartment has two transversely spaced side panels which form part of walls surrounding the luggage compartment. A shelf in the form of a flat panel has a first pair of pins laterally projecting, in the opposite directions, from forward end portion of the shelf, and a second pair of pins laterally projecting, in the opposite directions, from rearward end portion of the shelf. A forward pair of means fixed relative to the side panels, respectively, have U-shaped members made of a resilient material for detachably and rotatably retaining the forward pair of pins, whereas a rearward pair of means fixed relative to the side panels, respectively, have U-shaped members made of a resilient material for detachably and rotatably retaining the rearward pair of pins, respectively, so that the shelf can be manually lifted to swing outwardly from the luggage compartment about the forward pair of pins or the rearward pair of pins as a pivot axis and that the shelf can be manually detached from the forward and rearward pair of means.

1 Claim, 3 Drawing Figures

MOTOR VEHICLE WITH A SHELF IN ITS LUGGAGE COMPARTMENT

The present invention relates to a motor vehicle having a hatch to close its luggage compartment, such as a hatch back coupe, a van, a wagon.

A known motor vehicle of the above character is provided in its luggage compartment with a substantially flat shelf. The shelf is hinged at its forward end so as to facilitate loading or unloading the luggage compartment after opening the hatch. This arrangement has a disadvantage that it is impossible to load or unload the luggage compartment with luggage from the interior of a passenger compartment of the vehicle. Another known motor vehicle of the above character is provided in its luggage compartment with a cover openable by a zipper. Although this arrangement permits loading or unloading the luggage compartment with luggage both from the interior and exterior of the vehicle, the cover can not act as a shelf.

It is a main object of the present invention to provide a motor vehicle having a hatch to close its luggage compartment in which a shelf is arranged such that it permits loading or unloading the luggage compartment with luggage both from the interior and exterior of the vehicle and when relatively large luggage is to be put in or out of the luggage compartment the shelf can be removed to provide a large opening.

Other objects and advantages of the present invention will be apparent from the following description in connection with the accompanying drawings, in which.

Figure 1:
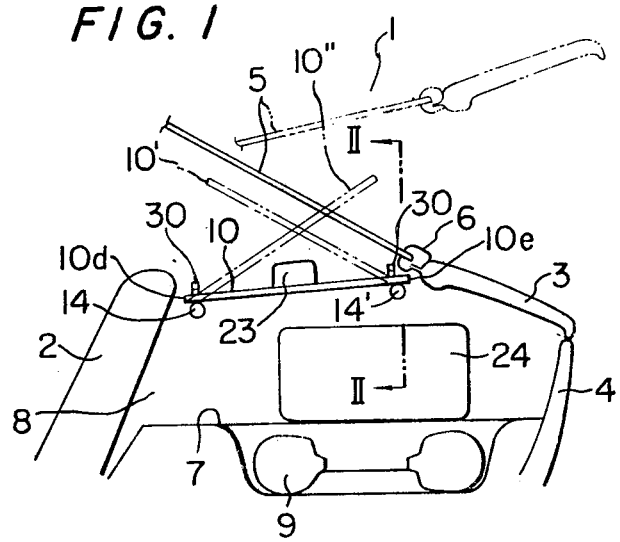
FIG. 1 is a sectional view of a rear portion of a motor vehicle having a hatch to close a luggage compartment.

In FIG. 1 the motor vehicle is generally designated by reference numeral 1 and comprises a seat having a seat back 2, a tail gate panel 3, a rear end panel 4, a rear windshield 5, a weatherstrip 6 and a luggage floor panel 7. Designated by reference numeral 8 is an open luggage compartment which is closed or opened by a hatch including the tail gate panel 3 and the rear windshield 5. The luggage compartment 8 is disposed behind the seat back 2. Designated by reference numeral 9 is a spare tire, designated by reference numeral 10 is a shelf and designated by reference numeral 11 are side panels. Each of the side panels has an inner panel 11a and an outer panel 11b. Designated by reference numeral 12 are side windshields and designated by numeral 13 are weatherstrips.

The shelf 10 has a forward pair of pins 14 laterally projecting, in the opposite directions, from a forward end portion thereof and a rearward paid of pins 14' laterally projecting, in the opposite directions, from a rearward end portion thereof. The two forward pins 14 has their free ends disposed in a line, and the two rearward pins 14' has their free ends disposed in a line parallel to the preceding line. Each of the pins 14 and 14' projects downwardly downwardly from the underside 10b of the shelf 10 and has its free end extending outwardly of the shelf 10 beyond the lateral side 10a (see FIG. 2).

Figure 2:
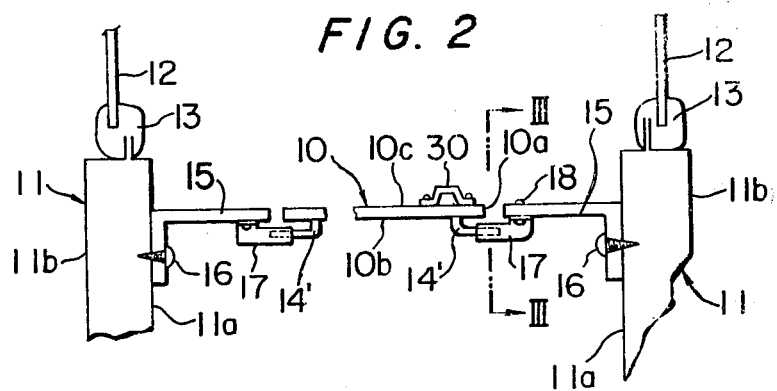
FIG. 2 is a sectional view taken through a line II—II in FIG. 1.
Figure 3:
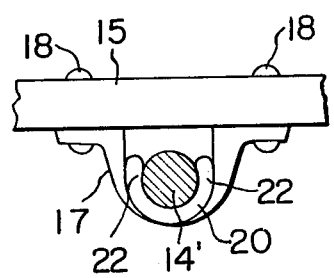
FIG. 3 is a sectional view taken through a line III—III in FIG. 2.

Secured to the inner panel 11a of each of the side panels 11 is a bracket 15, the bracket being fixed with respect to the side panel 11 by means of a plurality of biases, only one being shown at 16. For supporting the pins 14 and 14', respectively, four means are provided, only one being shown at 17. Each means 17 is secured to the bracket 15 by means of suitable fasteners 18 and has a U-shaped member 20. The U-shaped member is made of a resilient material, is open upwardly and has two legs 22 between which each of the pins 14 and 14' is rotatably snugly disposed. Distance between the two legs 22 of the U-shaped member 20 at their free ends shall be slightly smaller than the maximum thickness of the pin 14 so that the pin is retained in position. In FIGS. 1 and 2, designated by reference numerals 30 are pulls secured to the shelf 10.

When the shelf 10 is in the position illustrated by solid line in FIG. 1 in which all the pins 14 and 14' are snugly received by the U-shaped portions 20, respectively, a relatively small parcel 23 can be put on the upper side 10c of the shelf 10 and a space under the shelf 10 within the luggage compartment 8 can accommodate a relatively large parcel 24.

When a vehicle occupant wants to take the parcel 24 under the shelf 10 from a passenger compartment 25 of the vehicle, he pulls the forward end portion of the shelf 10 upwardly to remove the pins 14 from the corresponding U-shaped members 20 so that the shelf 10 swings outwardly of the luggage compartment 8 and clockwise toward an open position 10' with the other pins 14' rotating in the corresponding U-shaped members 20 and acting as a hinge. By so doing, opening is provided for the vehicle occupant to take the parcel 24.

When one wants to take the luggage 24 from the outside of the vehicle 1, he opens the hatch to provide an opening between the rearward end portion of the shelf 10 and the rear end panel 4. If necessary, he pulls the rearward end portion of the shelf upwardly to remove the pins 14' from the corresponding U-shaped members 20 so that the shelf swings outwardly of the luggage compartment 8 and counterclockwise toward an open position 10'' with the other pins 14 rotating in the corresponding U-shaped members 20. By so doing a larger opening is provided for taking the parcel 24 out of the space under the shelf 24.

Thus it will be observed that the parcel 24 can be taken out of the space under the shelf 10 by a person within the passenger compartment 25 as well as a person in the outside of the vehicle 1.

It is to be noted that the pins 14 and 14' may be fixed with respect to the side panels 11 of the vehicle and the U-shaped members 20 may be fixed with respect to the shelf 10 with their openings directed downwardly.

It will now be observed from the preceding that the shelf 10 acts as its function and its installation permits a parcel disposed under the shelf within the luggage compartment 8 to be taken out of the luggage compartment from the passenger compartment 25.

It will also be observed that the shelf 10 can be easily removed from the luggage compartment 8 to provide an opening wide enough to permit a large parcel, such as a spare tire or a baby car to be taken out of the luggage compartment 8.

It will also be observed that a relatively bulky parcel can be brought into the luggage compartment 8 only if the shelf 10 is removed.

What is claimed is:

1. In a motor vehicle:
   a seat with a seat back;
   an open luggage compartment behind said seat back, said open luggage compartment having two transversely spaced side panels which form part of walls surrounding said luggage compartment;

a shelf, in the form of a flat panel, having a first pair of pins laterally projecting, in the opposite directions, from a first end portion said flat panel, and a second pair of pins laterally projecting, in the opposite directions, from a second end portion opposite to the first end portion;

a first pair of means fixed relative to said side panels, respectively, and having U-shaped members made of a resilient material, respectively, for detachably and rotatably retaining said first pair of pins, respectively, said first pair of means being disposed adjacent said seat;

a second pair of means fixed relative to said side panels, respectively, and having U-shaped members made of a resilient material, respectively, for detachably and rotatably retaining said second pair of pins, respectively, said second pair of means being disposed remote from said seat.

* * * * *